United States Patent
Liu

(10) Patent No.: US 9,852,532 B2
(45) Date of Patent: Dec. 26, 2017

(54) PROJECTION DEVICE AND INFORMATION PROCESSING METHOD THEREOF

(71) Applicants: Beijing Lenovo Software Ltd., Haidian District, Beijing (CN); Lenovo (Beijing) Co., Ltd., Haidian District, Beijing (CN)

(72) Inventor: Junfeng Liu, Beijing (CN)

(73) Assignees: BEIJING LENOVO SOFTWARE LTD., Haidian District, Beijing (CN); LENOVO (BEIJING) CO., LTD., Haidian District, Beijing (CN)

(*) Notice: Subject to any disclaimer, the term of this patent is extended or adjusted under 35 U.S.C. 154(b) by 701 days.

(21) Appl. No.: 14/104,465

(22) Filed: Dec. 12, 2013

(65) Prior Publication Data

US 2014/0168257 A1 Jun. 19, 2014

(30) Foreign Application Priority Data

Dec. 13, 2012 (CN) .......................... 2012 1 0540278

(51) Int. Cl.
*G03B 21/20* (2006.01)
*G06T 11/60* (2006.01)
(Continued)

(52) U.S. Cl.
CPC .............. *G06T 11/60* (2013.01); *F21V 14/00* (2013.01); *G03B 21/00* (2013.01); *G03B 21/2066* (2013.01)

(58) Field of Classification Search
CPC .. H04N 9/3129; H04N 9/3147; H04N 9/3161; H04N 13/0459; H04N 5/7458; H04N 9/3164; H04N 9/3173; H04N 9/3185; H04N 9/3188; G03B 21/28; G03B 21/206; G03B 21/2013; G03B 21/00;
(Continued)

(56) References Cited

U.S. PATENT DOCUMENTS

| | | | |
|---|---|---|---|
| 2003/0025842 A1* | 2/2003 | Saccomanno ...... | G02B 27/1046 348/758 |
| 2007/0195294 A1* | 8/2007 | Willey .................. | G03B 21/26 353/119 |

(Continued)

*Primary Examiner* — Christina Riddle
*Assistant Examiner* — Christopher Lamb, II
(74) *Attorney, Agent, or Firm* — Brinks Gilson & Lione; G. Peter Nichols

(57) ABSTRACT

A projection device and an information processing method are described. The projecting device includes a display image generation unit for generating a plurality of frames of the continuous images to be displayed; a light source unit for receiving the plurality of frames of the continuous images to be displayed generated by the display image generation unit and forming a corresponding set of the light rays sequentially; a light path transformation unit having N kinds of optical states, N is the natural number greater than 1; a projecting unit for projecting the light rays inputted to it to the first to $N^{th}$ projection regions; and a control unit for controlling the light source unit so that the images to be displayed are switched in a predetermined frequency, and for controlling the light path transformation unit so that the N kinds of optical states are switched in the predetermined frequency.

15 Claims, 5 Drawing Sheets

(51) Int. Cl.
*F21V 14/00* (2006.01)
*G03B 21/00* (2006.01)

(58) Field of Classification Search
CPC .............. G03B 21/005; G03B 21/2066; G03B 21/2033; G03B 21/26; G03B 21/2006; G03B 21/147; G03B 21/142; G06F 3/0421; G06F 3/017; G02B 27/283; F21V 7/0016; F21V 7/0025; F21V 14/04; F21V 14/00
USPC ...................................... 345/629; 353/30, 82
See application file for complete search history.

(56) References Cited

U.S. PATENT DOCUMENTS

| | | | | |
|---|---|---|---|---|
| 2008/0055566 A1* | 3/2008 | Yun | ........................ | G03B 21/14 353/82 |
| 2008/0074625 A1* | 3/2008 | Lai | ........................ | G03B 21/28 353/82 |
| 2010/0231868 A1* | 9/2010 | Chen | .................... | H04N 9/3129 353/82 |
| 2010/0309391 A1* | 12/2010 | Plut | ...................... | H04N 9/3147 348/756 |
| 2011/0122627 A1* | 5/2011 | Hikmet | ................... | F21S 10/00 362/259 |
| 2011/0181840 A1* | 7/2011 | Cobb | .................. | H04N 9/3147 353/31 |
| 2012/0032875 A1* | 2/2012 | Sprowl | .................. | G02B 27/01 345/156 |
| 2012/0120374 A1* | 5/2012 | Keh | ....................... | G03B 21/28 353/85 |
| 2012/0256879 A1* | 10/2012 | Liu | ........................ | G02B 27/26 345/175 |
| 2013/0016078 A1* | 1/2013 | Kodali | .................... | G09F 19/16 345/204 |
| 2013/0155336 A1* | 6/2013 | Nagashima | .......... | G02B 26/101 349/8 |
| 2013/0222771 A1* | 8/2013 | Tsubota | ............... | G02B 26/101 353/20 |
| 2013/0271844 A1* | 10/2013 | Cheng | ................ | G02B 27/1066 359/619 |
| 2014/0118701 A1* | 5/2014 | Lee | ........................ | G03B 21/28 353/34 |
| 2015/0116603 A1* | 4/2015 | Guthrie | ............... | G03B 21/206 348/758 |

* cited by examiner

PROJECTION DEVICE AND INFORMATION PROCESSING METHOD THEREOF

This application claims priority to Chinese patent application No. 201210540278.9 filed on Dec. 13, 2012, the entire contents of which are incorporated herein by reference.

BACKGROUND

The present application relates to a projecting device and an information processing method thereof. Particularly, the present application relates to a projecting device which is capable of displaying a plurality of pictures with different contents simultaneously through one projecting device and an information processing method thereof.

The projector which displays an enlarged image is widely used in demonstration and home theater. At present, it has been used to perform a demonstration in the meeting room and display a movie on a large screen in the home by connecting the device such as a DVD player. In the movie theatre, the digital movie projector has also begun to replace the old cine film and used as the screen with respect to the hard disk digital data. Since the image is usually enlarged in projection, the projection display is a cheaper way of achieving a large screen display. There are many kinds of projectors; however, the existing projecting system can only display one picture.

SUMMARY

In view of the above circumstance, in order to provide a better visual experience for the user, it is desired to provide a projecting device which is capable of displaying a plurality of pictures with different contents simultaneously through one projecting device and an information processing method thereof.

According to an aspect of the present application, there is provided a projecting device comprises: a display image generation unit for generating a plurality of frames of the continuous images to be displayed according to a plurality of groups of image frames inputted; a light source unit for receiving the plurality of frames of the continuous images to be displayed generated by the display image generation unit and forming a corresponding set of the light rays sequentially according to the frames of the images to be displayed; a light path transformation unit having N kinds of optical states, in the first optical state, the light ray irradiated to the light path transformation unit is transformed to the first direction; in the second optical state, the light ray irradiated to the light path transformation unit is transformed to the second direction; in the $N^{th}$ optical state, the light ray irradiated to the light path transformation unit is transformed to the $N^{th}$ direction; N is the natural number greater than 1; a projecting unit for projecting the light rays inputted to it to the first to $N^{th}$ projection regions; and a control unit for controlling the light source unit so that the images to be displayed are switched in a predetermined frequency, and controlling the light path transformation unit so that the N kinds of optical states are switched in the predetermined frequency.

Preferably, in the projecting device according to the embodiment of the present application, in the plurality of frames of the continuous images to be displayed, two frames of image separated by N frames can be displayed in the same projection region.

Preferably, in the projecting device according to the embodiment of the present application, the light path transformation unit comprises: (N−1) first switch elements, every one of which has an on state and an off state, in the on state, the light rays inputted pass through completely, but in the off state, the light rays inputted are reflected completely, and wherein through controlling the on state and the off state of (N−1) first switch elements by the control unit, the light rays irradiated from the light source unit are finally projected to the first to the $N^{th}$ projection regions respectively.

Preferably, in the projecting device according to the embodiment of the present application, the light path transformation unit comprises: a beam splitter, the outer surface of which is attached with a half transparent and half reflecting film, so that a portion of the light rays inputted transmits and the other portion of the light rays is reflected, and the transmitting light rays and the reflected light rays both correspond to a frame of the whole image; N second switch elements, every one of which has an on state and an off state, in the on state, the light rays inputted pass through completely, but in the off state, the light rays inputted are blocked completely, wherein through controlling the on state and the off state of N second switch elements by the control unit, the light rays irradiated from the light source unit are finally projected to the first to the $N^{th}$ projection regions respectively.

Preferably, in the projecting device according to the embodiment of the present application, the light path transformation unit comprises: a beam splitter, the outer surface of which is attached with a half transparent and half reflecting film so that a portion of the light rays inputted transmits and the other portion of the light rays is reflected, and the transmitting light rays and the reflected light rays both correspond to a frame of the whole image; X first switch units, everyone of which has an on state and an off state, in the on state, the light rays inputted pass through completely, but in the off state, the light rays inputted are reflected completely; Y second switch units, everyone of which has an on state and an off state, in the on state, the light rays inputted pass through completely, but in the off state, the light rays inputted are blocked completely; wherein through controlling the on state and the off state of the X first switch units and the y second switch units by the control unit, the light rays irradiated from the light source unit are finally projected to the first to the $N^{th}$ projection regions respectively, wherein X and Y are both natural numbers, and 2X+Y=N.

Preferably, in the projecting device according to the embodiment of the present application, the beam splitter includes (N−1) independent beam splitters, and the outer surface of every independent beam splitter is attached with a half transparent and half reflecting film.

Preferably, in the projecting device according to the embodiment of the present application, the beam splitter is an independent beam splitter, inside of which are (N−1) half transparent and half reflecting films arranged in a predetermined interval.

Preferably, in the projecting device according to the embodiment of the present application, the number of the projecting unit is 1, and the light rays irradiated from the light source unit are incident on the light path transformation unit through the projecting unit.

Preferably, in the projecting device according to the embodiment of the present application, the number of the projecting unit is N, and the light rays irradiated from the light source unit are incident on the N projecting units respectively after passing through the light path transformation unit.

Preferably, in the projecting device according to the embodiment of the present application, a portion of at least two projection regions in the first to the $N^{th}$ projection regions overlap.

Preferably, in the projecting device according to the embodiment of the present application, the plane in which the first projection region lies is vertical to that in which the second projection region lies, and the first image is displayed in the first projection region, and the second image is displayed in the second projection region.

Preferably, in the projecting device according to the embodiment of the present application, the first image is used to present contents to the user and the second image is used to receive the user's input, and the projecting device further comprises: an information acquiring unit for acquiring the input with respect to the second image by the user.

Preferably, in the projecting device according to the embodiment of the present application, with respect to the first group of image frames to the $N^{th}$ group of image frames inputted, the display image generation unit generates the plurality of frames of the continuous images to be displayed in order of the first frame in the first group, the first frame in the second group, and until the first frame in the $N^{th}$ group, the second frame in the first group, the second frame in the second group, and until the second frame in the $N^{th}$ group, and the last frame in the first group, the last frame in the second group and until the first frame in the $N^{th}$ group and n projection regions are separated from each other.

Preferably, in the projecting device according to the embodiment of the present application, with respect to the group of image frames inputted, the display image generation unit first divides the image frames into N sub-images frame by frame, then generates a plurality of frames of the continuous images to be displayed in order of the first frame in the first sub-image, the first frame in the second sub-image, and until the first frame in the $N^{th}$ sub-image, the second frame in the sub-image, the second frame in the second sub-image, and until the second frame in the $N^{th}$ sub-image, and the last frame in the first sub-image, the last frame in the second sub-image and until the first frame in the $N^{th}$ sub-image, and n projection regions are pieced into the projection region with the area larger than that of single projection region.

According to another aspect of the present application, there is provided an information processing method applied in a projecting device, the method comprises the steps of: generating a plurality of frames of the continuous images to be displayed according to a plurality of groups of image frames inputted; forming a corresponding set of the light rays sequentially according to the frames of the images to be displayed, wherein the images to be displayed are switched in a predetermined frequency; performing a control to enable the set of the light rays to switch among N kinds of optical states in a predetermined frequency, in the first optical state, the set of the light rays is transformed to the first direction; in the second optical state, the set of the light rays is transformed to the second direction; in the $N^{th}$ optical state, the set of the light rays is transformed to the $N^{th}$ direction; N is the natural number greater than 1; converging and projecting the set of the light rays to $1^{st}$ to $N^{th}$ projection regions so as to form an image.

Preferably, in the information processing method according to the embodiment of the present application, in the plurality of frames of the continuous images to be displayed, two frames of image separated by N frames can be displayed in the same projection region.

Preferably, in the information processing method according to the embodiment of the present application, a portion of at least two projection regions in the first to the $N^{th}$ projection regions overlap.

Preferably, in the information processing method according to the embodiment of the present application, the plane in which the first projection region lies is vertical to that in which the second projection region lies, and the first image is displayed in the first projection region, and the second image is displayed in the second projection region.

Preferably, in the information processing method according to the embodiment of the present application, the first image is used to present contents to the user and the second image is used to receive the user's input, and the method further comprises the step of: acquiring the input with respect to the second image by the user.

Preferably, in the information processing method according to the embodiment of the present application, with respect to the first group of image frames to the $N^{th}$ group of image frames inputted, generating the plurality of frames of the continuous images to be displayed in order of the first frame in the first group, the first frame in the second group, and until the first frame in the $N^{th}$ group, the second frame in the first group, the second frame in the second group, and until the second frame in the $N^{th}$ group, and the last frame in the first group, the last frame in the second group and until the first frame in the $N^{th}$ group, and N projection regions are separated from each other.

Preferably, in the information processing method according to the embodiment of the present application, with respect to the group of image frames inputted, first dividing the image frames into N sub-images frame by frame, then generating a plurality of frames of the continuous images to be displayed in order of the first frame in the first sub-image, the first frame in the second sub-image, and until the first frame in the $n^{th}$ sub-image, the second frame in the sub-image, the second frame in the second sub-image, and until the second frame in the $N^{th}$ sub-image, and the last frame in the first sub-image, the last frame in the second sub-image and until the first frame in the $N^{th}$ sub-image, and piecing N projection regions into the projection region with the area larger than that of single projection region.

Through the projecting device and the information processing method thereof, it is possible to provide a multi-picture system, so that the flexibility and convenience of the product are greatly improved. Furthermore, the multi-picture can form the different spatial (stereo) arrangement so as to satisfy the demands of different usage scenarios. In addition, the multi-picture system only uses one set of projection source, which is concise, and the matched interactive system will be more novel, which can be operated by the different users or can be operated collectively by one user.

DETAILED DESCRIPTION

The preferred embodiments of the present application will be described as follows with reference to the accompanying drawings. The following descriptions with reference to the accompanying drawings are provided to assist the understanding of the example embodiments of the present application defined by the claims and the equivalents thereof. Therefore, it should be understood by those skilled in the art that various modifications and alterations can be made without departing from the spirit and scope of the present application. Furthermore, the detailed descriptions relating to the functions and structures well known in the field will be omitted to make the descriptions clear and concise.

Figure 1:
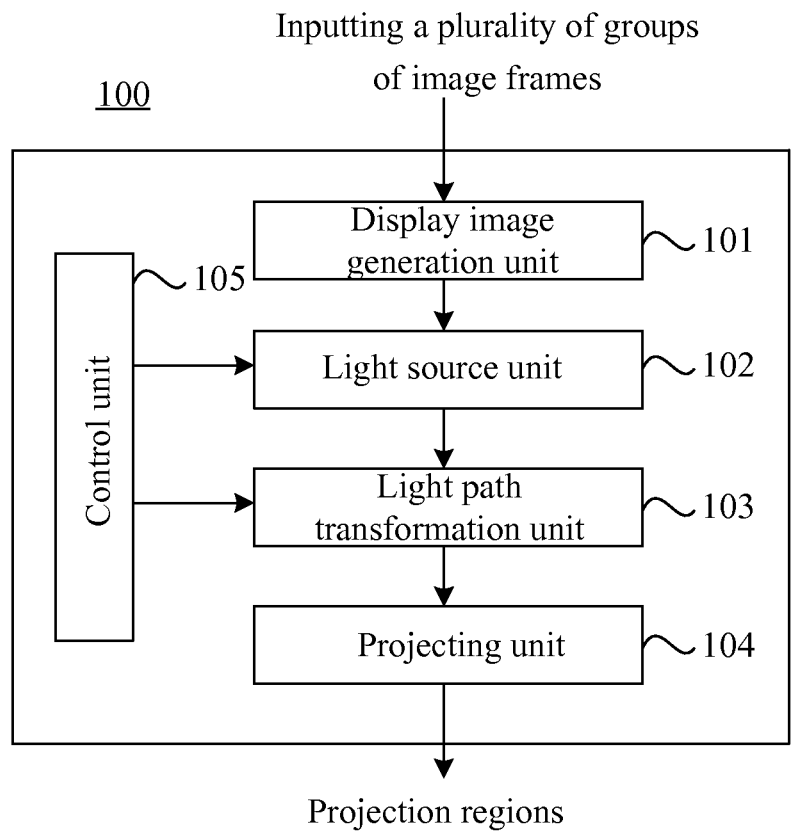
FIG. 1 is a block diagram illustrating the functional configuration of the components of the projecting device according to the first embodiment of the present application.

Firstly, the projecting device according to the first embodiment of the present application will be described with reference to FIG. 1. As shown in FIG. 1, the projecting device 100 comprises a display image generation unit 101, a light source unit 102, a light path transformation unit 103, a projecting unit 104 and a control unit 105.

Assumed that it is desired to display N pictures with different contents simultaneously, N groups of image frames are inputted, wherein the N pictures can all be the dynamic images (such as videos), or can all be the still images, or a part of them can be the dynamic images and the others can be the still images. It is to be noted that the respective images in a corresponding group of image frames are different when the picture to be displayed is a dynamic image, and the respective images in a corresponding group of image frames are the same when the picture to be displayed is a still image, wherein N is a natural number greater than 1.

The display image generation unit 101 generates a plurality of frames of the continuous images to be displayed according to a plurality of groups of image frames inputted. According to the concept of the embodiment of the present application, there is only one projecting device to display a plurality of pictures simultaneously, thus the display image generation unit 101 is aimed to combine the image sources corresponding to the plurality of pictures to be displayed into one image source which is provided to the light source unit 102 (that will be described thereafter), and the control unit 105 (that will be described thereafter) controls it to switch in a predetermined frequency so that the different images can be projected to the different regions at different times. Due to the persistence characteristic of the human eyes, it seems that the plurality of pictures are displayed simultaneously when the predetermined frequency is high enough. It is to be noted that when the images to be displayed are switched in the predetermined frequency, the refresh frequency of the n groups of image frames displayed on the N projection regions respectively is 1/Nn of the predetermined frequency. In view of the fact that the human eyes can perceive a flicker for the pictures with a fresh frequency below a threshold frequency, thus, the predetermined frequency should greater than or equal to N times of the threshold frequency.

For example, in cast that the N videos with different contents are displayed in the N projection regions, the plurality of groups of image frames inputted are the N videos, and the display image generation unit 101 generates a plurality of frames of the continuous images to be displayed in order as follows: the first frame in the first group, the first frame in the second group, . . . , the first frame in the $N^{th}$ group, the second frame in the first group, the second frame in the second group, . . . , the second frame in the $N^{th}$ group . . . (that is, until the last frame in the $N^{th}$ group).

As can be seen, the display image generation unit 101 forms the image in such an order that the N videos with different contents can be displayed in the N projection regions. Furthermore, two frames separated at a distance of N frames (such as the first frame in the first group and the second frame in the first group) can be displayed in the same projection region.

The light source unit 102 receives the plurality of frames of the continuous images to be displayed generated by the display image generation unit 101, and forms a corresponding set of the light rays sequentially according to the frames of the images to be displayed. Specifically, the light source unit 102 irradiates the light rays to the image display element to form the image according to the images to be displayed.

The light path transformation unit 103 has N kinds of optical states, in the first optical state, the light ray irradiated to the light path transformation unit 103 is transformed to the first direction; in the second optical state, the light ray irradiated to the light path transformation unit 103 is transformed to the second direction; . . . ; in the $N^{th}$ optical state, the light ray irradiated to the light path transformation unit 103 is transformed to the $N^{th}$ direction; wherein n is the natural number greater than 1.

When the light rays are irradiated from the light source unit 102, due to the existence of scattering, they present the scattering state upon reaching the projection regions, which leads them unwatchable. Thus, the projecting unit 104 is used to project the light rays inputted to the first to $N^{th}$ projection regions. Here, the first to $N^{th}$ projection regions correspond to the above-mentioned first direction to the $N^{th}$ direction respectively. The projecting unit 104 consists of a lens group, a reflecting mirror and the like.

The control unit 105 controls the light source unit 102 so that the images to be displayed are switched in the predetermined frequency, and controls the light path transformation unit 103 so that the n kinds of optical states are switched in the predetermined frequency.

Figure 2:
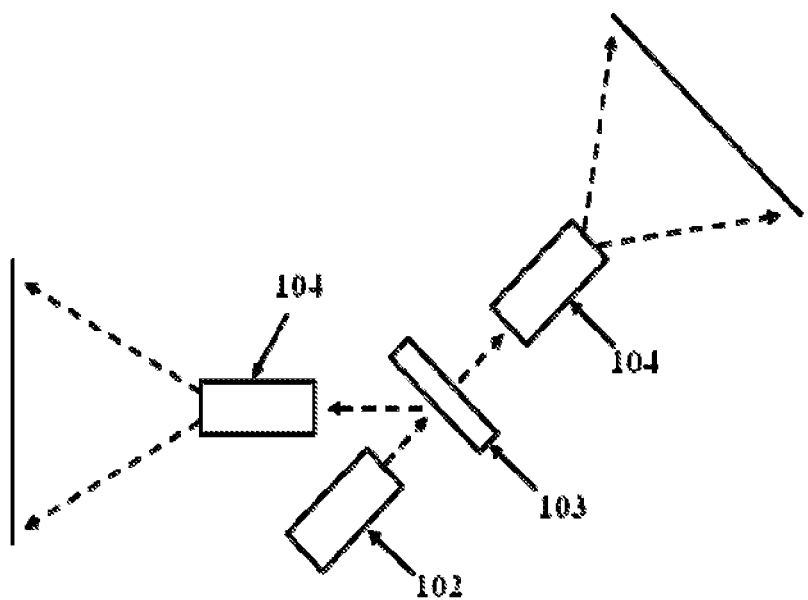
FIG. 2 is, taking N=2 for example, a diagram illustrating the spatial arrangement relationship and light path of the components in FIG. 1.

Taking N=2 for example, FIG. 2 illustrates the spatial arrangement relationship and light path of the light source unit 102, the light path transformation unit 103 and the projecting unit 104 in FIG. 1. As can be seen from FIG. 2, the number of the projecting unit 104 is equal to that of the projection regions.

Figure 3:
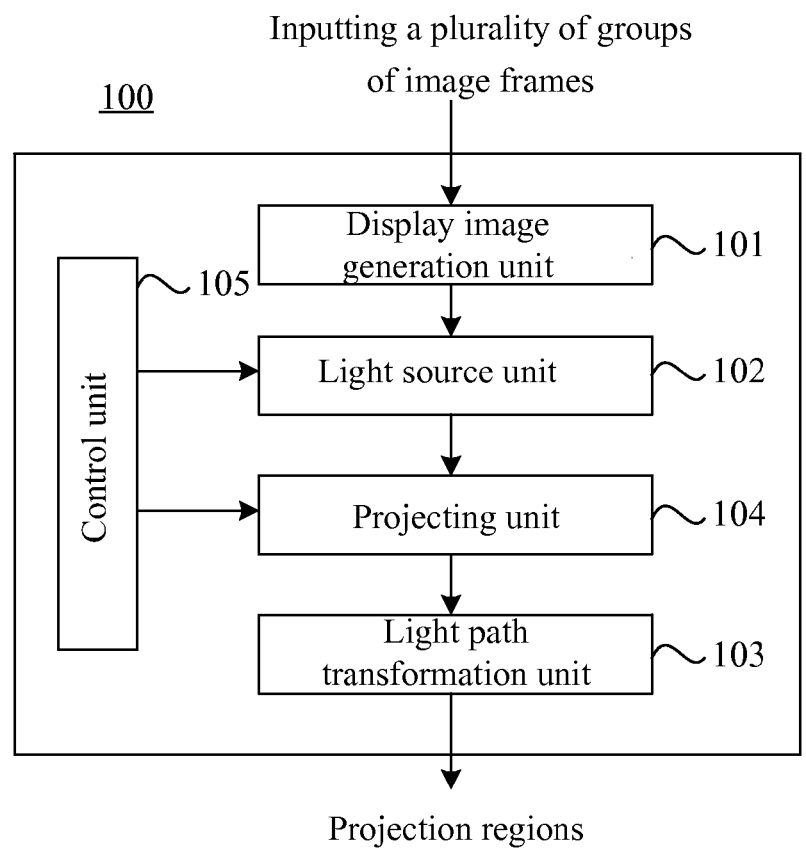
FIG. 3 is a block diagram illustrating the functional configuration of the components of the projecting device according to the second embodiment of the present application.
Figure 4:
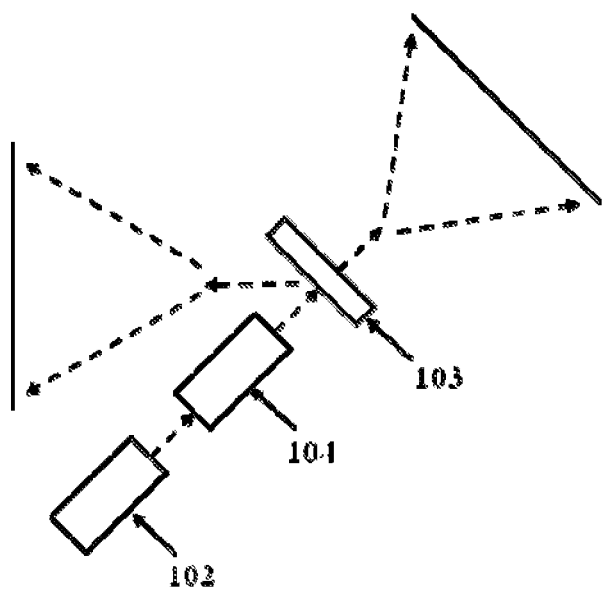
FIG. 4 is, taking N=2 for example, a diagram illustrating the spatial arrangement relationship and light path of the components in FIG. 3.

It is to be noted that FIG. 1 and FIG. 2 illustrate the case that the light path transformation unit 103 is located between the light source unit 102 and the projecting unit 104. That is, the light rays irradiated from the light source unit 102 are first transformed to the different light paths through the light path transformation unit 103 and then they are projected to the different projection regions by the projecting unit 104 on the different light paths. However, the present application is no limited to it. FIG. 3 and FIG. 4 illustrate another embodiment of the projecting device 100.

FIG. 3 illustrates the projecting device according to the second embodiment of the present application. As shown in FIG. 3, the projecting device 100 also comprises a display image generation unit 101, a light source unit 102, a light path transformation unit 103, a projecting unit 104 and a control unit 105. What different from FIG. 1 is that the projecting unit 104 is located between the light source unit 102 and the light path transformation unit 103. That is, the light rays irradiated from the light source unit 102 first pass through the projecting unit 104, and then they are transformed to the different light paths through the light path transformation unit 103 and projected to the different projection regions on the different light paths.

Taking N=2 for example, FIG. 4 illustrates the spatial arrangement relationship and light path of the light source unit 102, the light path transformation unit 103 and the projecting unit 104 in FIG. 3. As can be seen from FIG. 4, the projecting device 100 only comprises one projecting unit 104. The advantage of this embodiment lies in that the cost of hardware is lowered, but since only when the distance from the projecting unit to the projection region is a predetermined value, a clear picture can be achieved, thus it is needed to ensure that the distances from the projecting unit to the different projection regions are constant. In contrast, though the projecting device in the first embodiment comprises a plurality of projecting units which leads to a high hardware cost, it is possible to adjust the different projecting unit with respect to the different projection regions, thus it is more flexible compared with the projecting device in the second embodiment.

In addition, the space angles of the surfaces in which the projection regions lie are adjustable so as to present the different space demonstration effects (for example, a stereo double-screen demonstration effect for a game) to satisfy the demands of different usage scenarios. As the space angles of the surfaces in which the projection regions lie are different, the projecting device can also perform the corresponding adjustment to eliminate the image distortion and ensure the accuracy of the projected images. For example, there are two adjusting methods (which can be used respectively or simultaneously): (1) adjusting the angles between the surfaces in which the light source unit, the light path transformation unit, the projecting unit and the projection region lie; (2) performing the adjustment with respect to the source image.

Furthermore, the surface in which the projection region lies can be a plane or a curved surface (such as a portion of a sphere, or a portion of a cylindrical surface, or a hyperboloid, a free-form surface or the like).

In addition, the light path transformation unit 103 abovementioned can comprise (N−1) first switch elements, every one of which has an on state and an off state. In the on state, the light rays inputted pass through completely, but in the off state, the light rays inputted are reflected completely. Through controlling the on state and the off state of (N−1) first switch elements by the control unit 105, the light rays irradiated from the light source unit are finally projected to the first to the $N^{th}$ projection regions respectively.

Specifically, the first switch element can possess a mechanical or electrical performance so as to achieve the switch function and the reflection function. A mechanical way refers to a big mirror plane consisting of a plurality of little rotatable mirror plane, wherein the light rays can pass through or be reflected by rotate every little mirror plane to the different angles so as to achieve the switching of the switch. An electrical way refers to a electrical implementation similar to that of the principle of the liquid crystal, wherein the light rays can pass through or be reflected by applying different voltages to change the rotation angles of the liquid crystal so as to achieve the switching of the switch.

Figure 5:
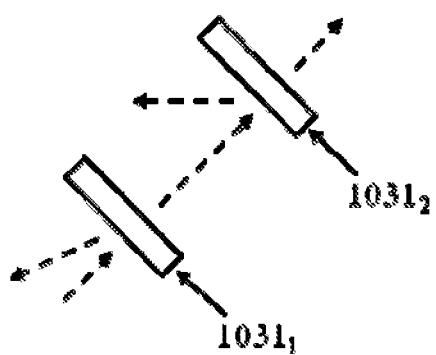
FIG. 5 is, taking N=3 for example, a diagram illustrating a structure example of the light path transformation unit 103.

Taking N=3 for example, FIG. 5 illustrates a structure example of the light path transformation unit 103. As can be seen from FIG. 5, the light rays are transformed to three different directions through two (that is, N−1) first switch elements 1031 (denoted as $1031_1$, $1031_2$ in the figure for distinction) in a parallel arrangement.

In addition, as another implementation, the light path transformation unit 103 above-mentioned can comprise a beam splitter, the outer surface of which is attached with a half transparent and half reflecting film, so that a portion of the light rays inputted transmits and the other portion of the light rays is reflected. It should be noted that the transmitting light rays and the reflected light rays both correspond to a frame of the whole image. Furthermore, the light path transformation unit 103 further can comprise N second switch elements, every one of which has an on state and an off state. Different from the above-mentioned first switch elements, in the on state, the light rays inputted pass through completely, but in the off state, the light rays inputted are blocked completely. Through controlling the on state and the off state of n second switch elements by the control unit 105, the light rays irradiated from the light source unit are finally projected to the first to the $N^{th}$ projection regions respectively.

Figure 6:
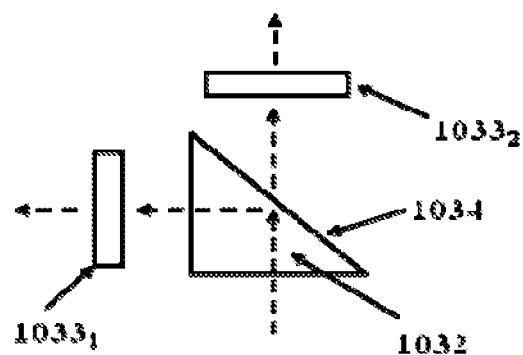
FIG. 6 is, taking N=2 for example, a diagram illustrating another structure example of the light path transformation unit 103.

Taking N=2 for example, FIG. 6 illustrates another structure example of the light path transformation unit 103. As can be seen from FIG. 6, the light path transformation unit 103 comprises one (that is, N−1) beam splitter 1032 and two (that is, N) second switch elements 1033 (denoted as $1033_1$, $1033_2$ in the figure for distinction), wherein the slope of the beam splitter 1032 is attached with a half transparent and half reflecting film 1034. The light rays can be transformed to two different directions through such structure.

The different structure examples of the light path transformation unit are described above with reference to FIG. 5 and FIG. 6. Wherein, the light path transformation unit can comprise the first switch element or can comprise the beam splitter and the second switch element. However, the present application is not limited to it. Alternatively, the first switch element, the second switch element and the beam splitter can be used in combination with each other. In this case, the light path transformation unit comprises: one beam splitter the outer surface of which is attached with a half transparent and half reflecting film so that a portion of the light rays inputted transmits and the other portion of the light rays is reflected; X first switch units, everyone of which has an on state and an off state, in the on state, the light rays inputted pass through completely, but in the off state, the light rays inputted are reflected completely; Y second switch units, everyone of which has an on state and an off state, in the on state, the light rays inputted pass through completely, but in the off state, the light rays inputted are blocked completely. Through controlling the on state and the off state of the X first switch units and the y second switch units by the control unit 105, the light rays irradiated from the light source unit are finally projected to the first to the $N^{th}$ projection regions respectively, wherein X and Y are both natural numbers. Since the light rays are transformed to two directions by using one first switch element, thus, in case that the number of the projection regions is N, X and Y should also satisfy the equation 2X+Y=N.

Figure 7:
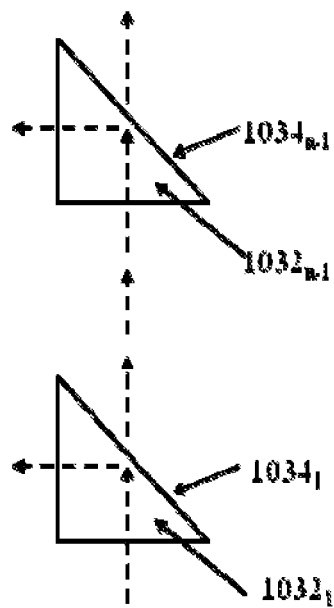
FIG. 7 is a diagram illustrating a possible embodiment of the beam splitter in the case that the number of the projecting regions is N.
Figure 8:
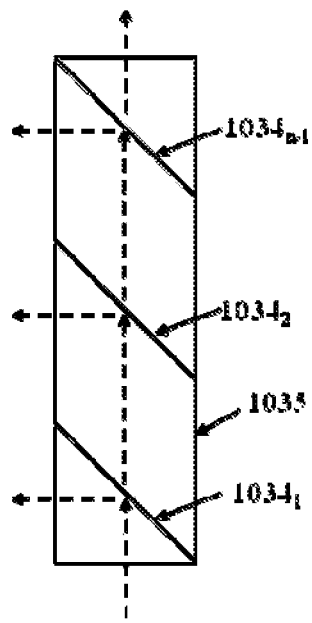
FIG. 8 is a diagram illustrating another possible embodiment of the beam splitter in the case that the number of the projecting regions is N.

In addition, the beam splitter can also comprise two possible forms as follows. For example, FIG. 7 illustrates a possible implementation of the beam splitter. As shown in FIG. 7, the beam splitter includes (N−1) independent beam splitters, and the outer surface of every independent beam splitter is attached with a half transparent and half reflecting film. These half transparent and half reflecting film can be the same or be different as needed (for example, ascending or descending).

As described above, it is possible to display N pictures with different contents in N different projection regions simultaneously through the projecting device according to the embodiment of the present application so as to provide a better visual experience for the user. In order to facilitate the description, it is assumed that N=2. For example, the plane in which the first projection region lies is vertical to that in which the second projection region lies. Furthermore, the first image is displayed in the first projection region, and the second image is displayed in the second projection region.

For example, the first image can be the image presented to the user (such as a display screen of a computer), and the second image can be the image for receiving the user's input (such as a keyboard of a computer). In this case, the projecting device 100 can also comprise an information acquiring unit 106 (such as a camera). When the user performs an operation on the keyboard displayed in the second projection region, the information acquiring unit 106 can acquire the operation information. In this way, through projecting the images to two mutually perpendicular (or nearly perpendicular) planes, the user can obtain an experience similar to a real computer operation.

Furthermore, it is to be noted that the optical implementation of the projecting unit includes the direct projection and the super-short focus slant projection. If the direct projection is adopted, the distance between the projecting device and the projection plane should be large enough (for example, several meters). But, if the super-short focus slant projection is adopted, the distance between the projecting device and the projection plane is only needed to be a relatively short distance (for example, several centimeters). Therefore, in the above-mentioned case that the display screen and the keyboard are projected to two mutually perpendicular planes, the direct projection is adopted for the optical implementation of the projecting unit which projects the image of the display screen, but the super-short focus slant projection is adopted for the optical implementation of the projecting unit which projects the image of the keyboard.

However, the present application is not limited to it. The size of the image projected by the projecting device is usually constant, and the ratio of the image is also constant. However, through the projecting device according to the embodiment of the present application, it is possible to enlarge the size of the image and change the ratio by making at least two projection regions among the first to the $N^{th}$ projection regions to overlap. It is to be noted that, in this case, when N projection regions are separate from each other and displaying the pictures with different contents, the N groups of image frames inputted to the display image generation unit (that is, the first group of image frames to the $N^{th}$ group of image frames) will generate a plurality of frames of the continuous images to be displayed in order as follows: the first frame in the first group, the first frame in the second group, . . . , the first frame in the $N^{th}$ group, the second frame in the first group, the second frame in the second group, . . . , the second frame in the $N^{th}$ group . . . . In contrast, a projection region with a size larger than single projection region is obtained by piecing N projection regions together, and in the case that a group of image frames are to be displayed in the pieced projection region, the group of image frames are inputted to the display image generation unit. Firstly, the image frames in the group are divided into N sub-images according to the piecing manner of the projection regions, then a plurality of frames of the continuous images to be displayed are generated in order of the first frame in the first group, the first frame in the second group, . . . , the first frame in the $N^{th}$ group, the second frame in the first group, the second frame in the second group, . . . , the second frame in the $N^{th}$ group . . . .

Hereinbefore, the detailed configurations of the projection device according to the embodiments of the present application are described with reference to FIG. 1 to FIG. 8. In the following, the information processing method of the projection device according to the embodiments of the present application will be described with reference to FIG. 9.

Figure 9:
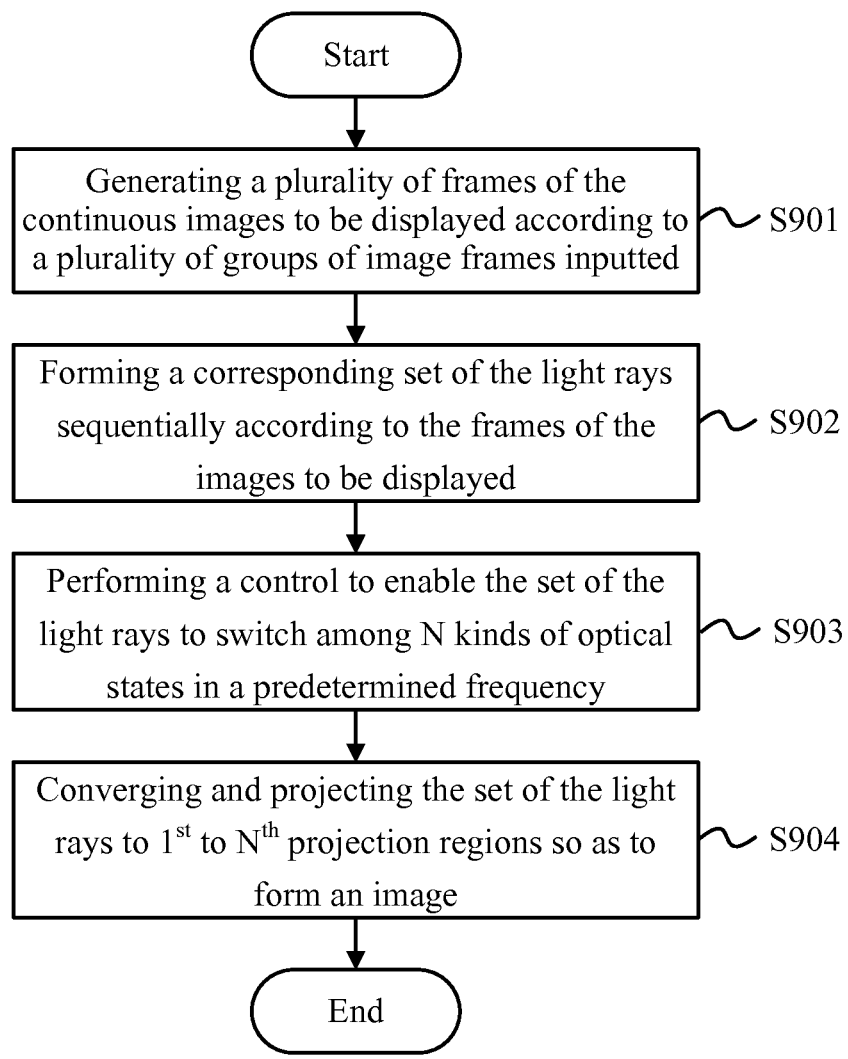
FIG. 9 is a flowchart illustrating the information processing method applied to the projecting device according to an embodiment of the present application.

As shown in FIG. 9, the method comprises the steps as follows:

Firstly, in step S901, generating a plurality of frames of the continuous images to be displayed according to a plurality of groups of image frames inputted.

Then, in step S902, forming a corresponding set of the light rays sequentially according to the frames of the images to be displayed, wherein the images to be displayed are switched in the predetermined frequency.

Next, in step S903, performing a control to enable the set of the light rays to switch among N kinds of optical states in a predetermined frequency: in the first optical state, the set of the light rays is transformed to the first direction; in the second optical state, the set of the light rays is transformed to the second direction; . . . ; in the $N^{th}$ optical state, the set of the light rays is transformed to the $N^{th}$ direction; wherein N is the natural number greater than 1.

Finally, in step S904, converging and projecting the sets of the light rays to $1^{st}$ to $N^{th}$ projection regions so as to form an image. It is to be noted that the first to $N^{th}$ projection regions correspond to the above-mentioned first direction to the $N^{th}$ direction respectively.

Here, the flow of the method wherein the light path is transformed and then the image is generated is described. However, similar to the projection device above-mentioned, in this method, it is possible to generate the image firstly and then transform the light path to project to the different projection regions. That is, step S903 and step S904 can be reversed with each other.

As above, in the plurality of frames of the continuous images to be displayed, two frames of image separated by N frames can be displayed in the same projection region.

In addition, as above, at least two projection regions among the first to the $N^{th}$ projection regions can be overlapped to achieve a larger projection image.

In addition, as above, in the case of some certain usage scenario (for example, it is desired to display the images of the computer screen and the keyboard in two projection regions respectively), the plane in which the first projection region lies is vertical to that in which the second projection region lies, and the first image is displayed in the first projection region, and the second image is displayed in the second projection region. Wherein, the first image is used to present contents to the user, and the second image is used to receive the user's input. Furthermore, in this case, the method further comprises the following step: acquiring the input with respect to the second image by the user.

In addition, in case that the N projection regions are separated from each other, step S901 comprises the step as follows: with respect to the first group of image frames to the $N^{th}$ group of image frames, a plurality of frames of the continuous images to be displayed are generated in order of the first frame in the first group, the first frame in the second group, . . . , the first frame in the $N^{th}$ group, the second frame in the first group, the second frame in the second group, . . . , the second frame in the $N^{th}$ group . . . (that is until the last frame in the $N^{th}$ group).

Whereas in case that N projection regions are pieced together to obtain a larger projection region, step S901 comprises the step as follows: with respect to the group of image frames, firstly, the image frames are divided into N sub-images frame by frame, then a plurality of frames of the continuous images to be displayed are generated in order of the first frame in the first sub-image, the first frame in the second sub-image, . . . , the first frame in the $N^{th}$ sub-image, the second frame in the first sub-image, the second frame in the second sub-image, . . . , the second frame in the $N^{th}$ sub-image . . . (that is until the last frame in the $N^{th}$ sub-image).

Since the information processing method according to the embodiment of the present application completely correspond to the above-described projecting device, the repeated description is omitted for conciseness.

It should be noted that, in this specification, the terms "comprising", "including" or any other variant are intended to cover a non-exclusive inclusion, so that the process, method, article or device comprising a series of elements comprises not only those elements, but also comprises other elements not expressly listed, or further comprises elements inherent in this process, method, article, or device. In the case of no more restrictions, the elements defined by the statement "comprises a . . . ", do not preclude the existence of additional identical elements in the process, method, article or device comprising the elements.

Finally, it should be noted that, the above-described series of processes comprise not only the processes performed in time series in the order described herein, but also comprise the processes performed concurrently or separately, instead of in chronological order.

Through the above description of the embodiments, the skilled in the art can clearly understand that the present invention can be implemented by means of software plus a necessary hardware platform; certainly, it can also be implemented entirely by hardware. Based on such understanding, all or part of the contribution of the technical solution of the present invention to the background art, may be embodied in the form of a software product, which can be stored in a storage medium, such as a ROM/RAM, hard disk, optical disk, etc., comprising a plurality of instructions for allowing a computer device (which may be a personal computer, a server, or a network device, etc.) to perform the methods described in various embodiments or in some portion of the embodiments of the present invention.

The above has described the present invention in detail, and specific examples are used herein to explain the principles and embodiments of the invention. However, the above description of the embodiments is only used to help understanding the methods and core ideas of the present invention; meanwhile, for the ordinary skilled in the art, based on the ideas of the invention, variations can be made both in implementations and application ranges; in summary, the content of this specification should not be understood as limitative to the present invention.

The invention claimed is:

1. A projecting device comprising: a display image generation unit for generating a plurality of frames of continuous images to be displayed according to a plurality of groups of image frames inputted; a light source unit for receiving the plurality of frames of continuous images to be displayed, generated by the display image generation unit and forming a corresponding set of light rays sequentially according to the frames of the images to be displayed; a light path transformation unit having N kinds of optical states, in a first optical state, the light ray irradiated to the light path transformation unit is transformed to a first direction; in an Nth optical state, the light ray irradiated to the light path transformation unit is transformed to an Nth direction; N being a natural number greater than 1; a projecting unit for projecting the light rays inputted to it to a first to Nth projection regions; and a control unit for controlling the light source unit so that the images to be displayed are switched in a predetermined frequency, and controlling the light path transformation unit so that the N kinds of optical states are switched in the predetermined frequency, wherein with respect to a first group of image frames to a Nth group of image frames inputted, the display image generation unit generates the plurality of frames of the continuous images to be displayed in order of a first frame in the first group, and until the first frame in the Nth group, a second frame in the first group, and until the second frame in the Nth group, and a last frame in the first group, and until the last frame in the Nth group, and N projection regions are separated from each other, wherein the light path transformation unit comprises: a beam splitter, the outer surface of which is attached with a half transparent and half reflecting film so that a portion of the light rays inputted transmits and the other portion of the light rays is reflected, and the transmitting light rays and the reflected light rays both correspond to a frame of the whole image; X first switch units, every one of which has an on state and an off state, in the on state, the light rays inputted pass through completely, but in the off state, the light rays inputted are reflected completely; Y second switch units, every one of which has an on state and an off state, in the on state, the light rays inputted pass through completely, but in the off state, the light rays inputted are blocked completely; wherein through controlling the on state and the off state of the X first switch units and the Y second switch units by the control unit, the light rays irradiated from the light source unit are finally projected to the first to the Nth projection regions respectively, wherein X and Y are both natural numbers, and 2X+Y=N.

2. The projecting device according to claim 1, wherein in the plurality of frames of the continuous images to be displayed, two frames of image separated by N frames can be displayed in the same projection region.

3. The projecting device according to claim 1, wherein the beam splitter includes (N−1) independent beam splitters, and the outer surface of every independent beam splitter is attached with a half transparent and half reflecting film.

4. The projecting device according to claim 1, wherein the beam splitter is an independent beam splitter, inside of which are (N−1) half transparent and half reflecting films arranged in a predetermined interval.

5. The projecting device according to claim 1, wherein the number of the projecting unit is 1, and the light rays irradiated from the light source unit are incident on the light path transformation unit through the projecting unit.

6. The projecting device according to claim 1, wherein the number of the projecting unit is N, and the light rays irradiated from the light source unit are incident on the N projecting units respectively after passing through the light path transformation unit.

7. The projecting device according to claim 1, wherein a portion of at least two projection regions in the first to the $N^{th}$ projection regions overlap.

8. The projecting device according to claim 1, wherein the plane in which the first projection region lies is vertical to that in which the second projection region lies, and the first image is displayed in the first projection region, and the second image is displayed in the second projection region.

9. The projecting device according to claim 8, wherein the first image is used to present contents to the user and the second image is used to receive the user's input, and the projecting device further comprises an information acquiring unit for acquiring the input with respect to the second image by the user.

10. The projecting device according to claim 1, wherein with respect to the group of image frames inputted, the display image generation unit first divides the image frames into N sub-images frame by frame, then generates a plurality of frames of the continuous images to be displayed in order of a first frame in a first sub-image and until the first frame in an $N^{th}$ sub-image, a second frame in the first sub-image, and until the second frame in the $N^{th}$ sub-image, and a last frame in the first sub-image, and until the last frame in the $N^{th}$ sub-image, and N projection regions are pieced into the projection region with the area larger than that of single projection region.

11. An information processing method applied in a projecting device comprising:
   generating a plurality of frames of the continuous images to be displayed according to a plurality of groups of image frames inputted;
   forming a corresponding set of the light rays sequentially according to the frames of the images to be displayed, wherein the images to be displayed are switched in a predetermined frequency;
   performing a control to enable the set of the light rays to switch among N kinds of optical states in a predetermined frequency, in a first optical state, the set of the light rays is transformed to a first direction; in a second optical state, the set of the light rays is transformed to a second direction; in an $N^{th}$ optical state, the set of the light rays is transformed to an $N^{th}$ direction; N being a natural number greater than 1;
   converging and projecting the set of the light rays to $1^{st}$ to $N^{th}$ projection regions so as to form an image,
   wherein with respect to a first group of image frames to a $N^{th}$ group of image frames inputted, generating the plurality of frames of the continuous images to be displayed in order of a first frame in the first group, and until the first frame in the $N^{th}$ group, a second frame in the first group, and until the second frame in the $N^{th}$ group, and a last frame in the first group, and until the last frame in the $N^{th}$ group, and N projection regions are separated from each other,
   wherein the projecting device comprises a light path transformation unit comprising:
   a beam splitter, the outer surface of which is attached with a half transparent and half reflecting film so that a portion of the light rays inputted transmits and the other portion of the light rays is reflected, and the transmitting light rays and the reflected light rays both correspond to a frame of the whole image;
   X first switch units, every one of which has an on state and an off state, in the on state, the light rays inputted pass through completely, but in the off state, the light rays inputted are reflected completely;
   Y second switch units, every one of which has an on state and an off state, in the on state, the light rays inputted pass through completely, but in the off state, the light rays inputted are blocked completely;
   wherein through controlling the on state and the off state of the X first switch units and the Y second switch units by the control unit, the light rays irradiated from the light source unit are finally projected to the first to the Nth projection regions respectively, wherein X and Y are both natural numbers, and 2X+Y=N.

12. The information processing method according to claim 11, wherein in the plurality of frames of the continuous images to be displayed, two frames of image separated by N frames can be displayed in the same projection region.

13. The information processing method according to claim 11, wherein the plane in which the first projection region lies is vertical to that in which the second projection region lies, and the first image is displayed in the first projection region, and the second image is displayed in the second projection region.

14. The information processing method according to claim 13, wherein the first image is used to present contents to the user and the second image is used to receive the user's input, and the method further comprises the step of acquiring the input with respect to the second image by the user.

15. The information processing method according to claim 11, wherein with respect to the group of image frames inputted, first dividing the image frames into N sub-images frame by frame, then generating a plurality of frames of the continuous images to be displayed in order of a first frame in a first sub-image, and until the first frame in a $N^{th}$ sub-image, a second frame in the first sub-image, and until the second frame in the $N^{th}$ sub-image, and a last frame in the first sub-image, and until the last frame in the $N^{th}$ sub-image, and piecing N projection regions into the projection region with the area larger than that of single projection region.

* * * * *